Figure 1:
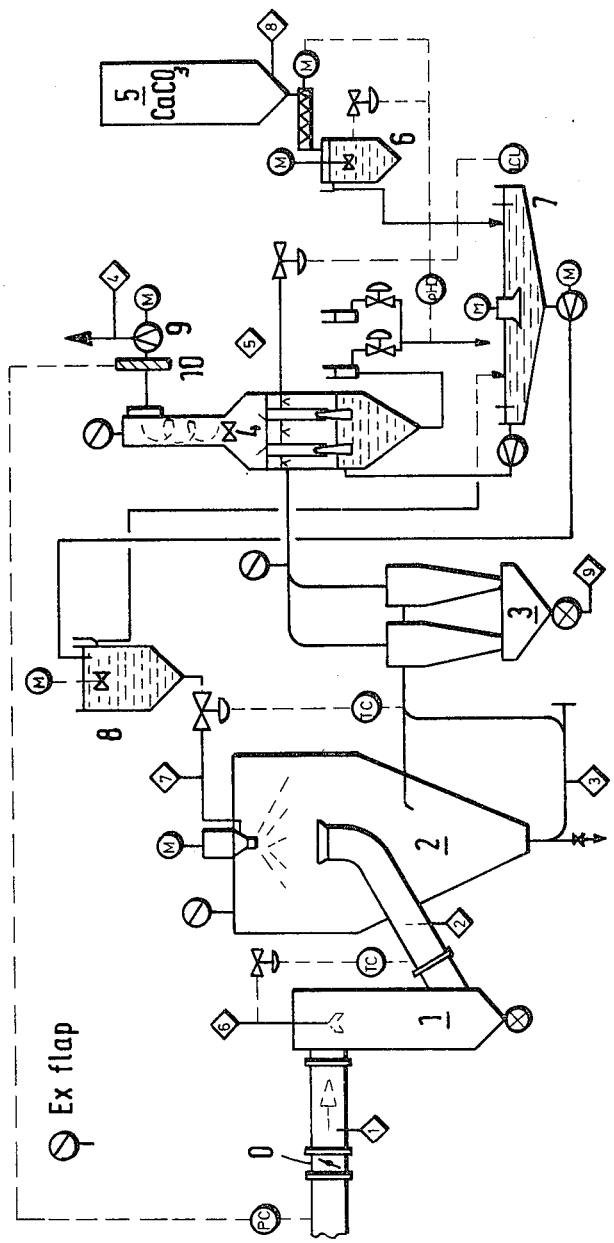

United States Patent [19]

Leisegang

[11] 4,317,806

[45] Mar. 2, 1982

[54] METHOD AND APPARATUS FOR DEDUSTING AND ABSORPTION OF CONTAMINATING GASES BEING THE EXHAUST GASES OF WASTE-INCINERATING DEVICES AND HOT-AIR CUPOLA FURNACES

[76] Inventor: Lutz Leisegang, Brahmsstr. 13, 1000 Berlin 33, Fed. Rep. of Germany

[21] Appl. No.: 194,292

[22] PCT Filed: Oct. 23, 1979

[86] PCT No.: PCT/DE79/00128
§ 371 Date: Jun. 23, 1980
§ 102(e) Date: Jun. 23, 1980

[87] PCT Pub. No.: WO80/00797
PCT Pub. Date: May 1, 1980

[30] Foreign Application Priority Data

Oct. 23, 1978 [DE] Fed. Rep. of Germany ....... 2846357
Jul. 20, 1979 [DE] Fed. Rep. of Germany ....... 2929974

[51] Int. Cl.³ .............................................. C01B 17/00
[52] U.S. Cl. .................................... 423/242; 423/210;
423/240; 266/147; 266/157; 55/71; 55/73;
55/85; 55/89; 422/170
[58] Field of Search .................. 55/71, 73, 85, 89;
423/240, 210, 242 A, 242 R; 266/147, 157;
422/170

[56] References Cited

U.S. PATENT DOCUMENTS

| 3,966,878 | 6/1976 | Pausch et al. ...................... 423/242 |
| 3,969,482 | 7/1976 | Teller ..................................... 55/73 |
| 4,013,455 | 3/1977 | Kleeberg et al. ...................... 55/84 |
| 4,019,444 | 4/1977 | Kleeberg et al. ...................... 55/84 |
| 4,198,380 | 4/1980 | Kohl ............................. 423/242 A |
| 4,246,242 | 1/1981 | Butler et al. ...................... 423/242 |
| 4,251,236 | 2/1981 | Fattinger et al. ...................... 55/84 |

FOREIGN PATENT DOCUMENTS

| 1961048 | 6/1971 | Fed. Rep. of Germany .......... 55/73 |
| 2846297 | 5/1979 | Fed. Rep. of Germany ...... 423/240 |
| 2753516 | 6/1979 | Fed. Rep. of Germany .......... 55/73 |
| 2261799 | 9/1975 | France . |

Primary Examiner—Bernard Nozick
Attorney, Agent, or Firm—Smyth, Pavitt, Siegemund & Martella

[57] ABSTRACT

The invention relates to a method for dedusting and absorption of contaminating gases in exhaust gases of waste-incinerating devices and hot-air cupola furnaces. In the essence, mud-containing circulation water is atomized in the exhaust gas, whereby dry waste mud is produced. After dust precipitation, the gas is fed to a scrubber which removes the contamination gases. The scrubbing liquid is neutralized and, possibly, mixed with ash and fed back into the circulation.

10 Claims, 3 Drawing Figures

METHOD AND APPARATUS FOR DEDUSTING AND ABSORPTION OF CONTAMINATING GASES BEING THE EXHAUST GASES OF WASTE-INCINERATING DEVICES AND HOT-AIR CUPOLA FURNACES

The invention relates to a method for dedusting and absorption of contaminating gases, particularly the absorption of hydrogen halides in exhaust gases from waste incinerating plants.

The cleaning of exhaust gases of incinerating plants containing hydrogen halides is usually carried out as a dry process for the suspended substances; i.e., hot electrofilters or hot fabric filters are used for that purpose. Subsequently, a gas saturation and scrubbing in watery acid takes place for the selective absorption of the hydrogen halide; the concentration of the acid being controlled by adding fresh water. This way, the final degree of purity of the exhaust gases is established. Presently, the $SO_2$, being also contained in the exhaust gas, is usually not yet absorbed but remains in the exhaust gas.

The acid solution generated during the absorption of the hydrogen halide is neutralized separately and results in a hot neutral salt solution as a waste product which causes considerable problems as to the waste water, because the salt solution increases the salt load on the receiving stream or ditch if used.

If the $SO_2$ content of the exhaust gas is also to be absorbed, the consumption of neutralizing substance is increased correspondingly and a salt mud is produced in addition to the salt solution which mud is to be separated prior to the discharge of the waste water. The drying of salt solutions by means of direct contact with hot gases poses considerable problems due to the requisite crystallization.

It is an object of the invention to provide a method and equipment for dedusting and cleaning exhaust gases such as top gas whereby hydrogen halides and, possibly, also $SO_2$ are to be removed from the exhaust gas.

The problem posed by the object is solved by this invention in accordance with the features set forth in the patent claims.

The invention will be described with reference to three flow charts.

Depicted are

Figure 2:
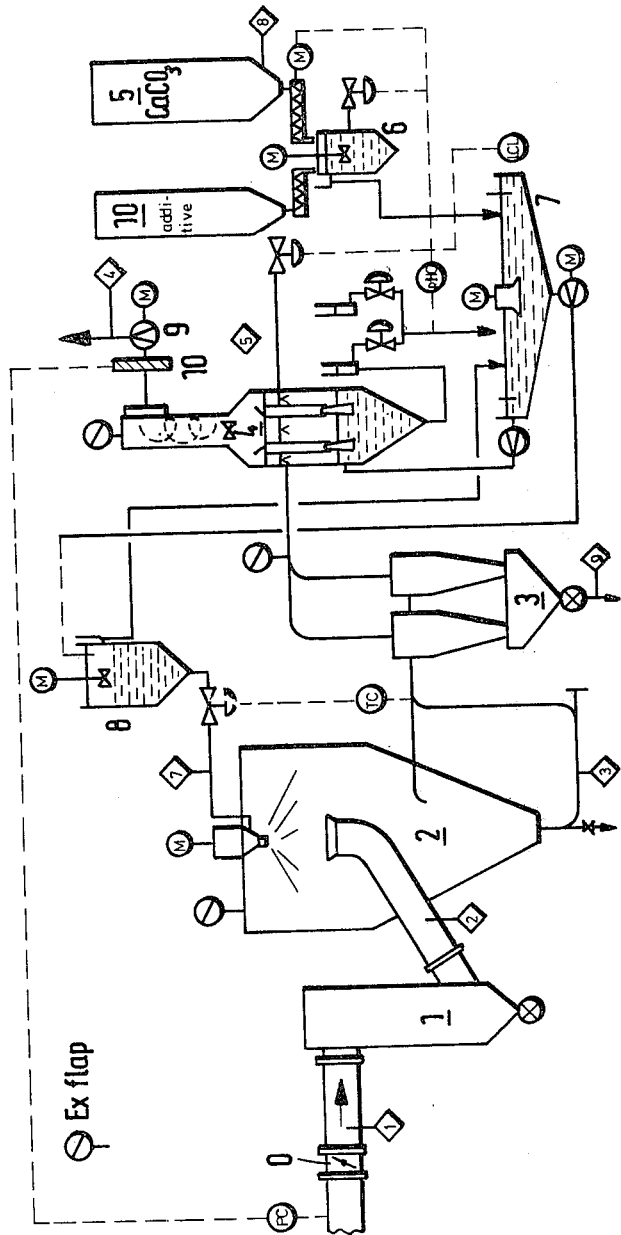
Figure 3:
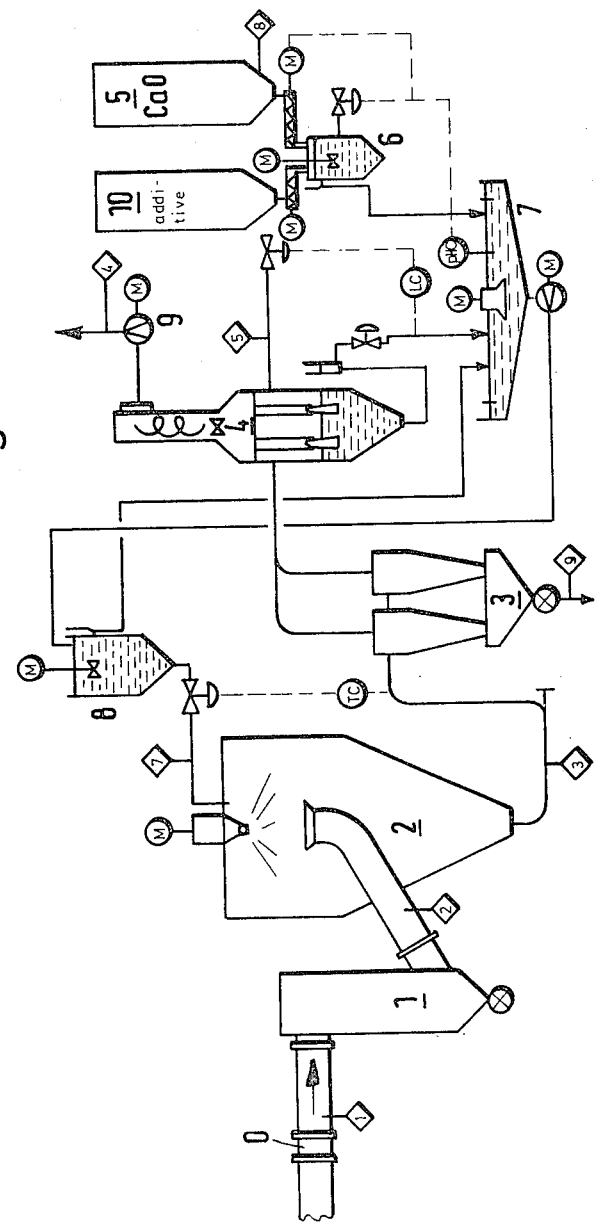

FIG. 1 is the employment of the method in accordance with the invention for the dedusting and cleaning of top gas of a cupola furnace, FIGS. 2 and 3 are two modifications for the dedusting and cleaning of exhaust gases of a waste-incinerating plant.

The exit or top gas discharged from a cupola furnace is first received by a presaturator 1 in which the gas is prededusted and during the melt-down phase is cooled also by evaporating fresh water. Subsequently, the top gas is fed to a drier-cooler-preabsorber 2. The neutralizing agent and the mud, drawn from circulating scrubbing water in the downstream scrubbing stages, are finely atomized in preabsorber 2, whereby occurs a preprecipitation of fluorides as well as of $SO_2$. The top gas is further cooled in 2, and the mud is dried so that it can be extracted as dry waste mud. The thus cooled and partially cleaned top gas is fed to a cyclone group 3, and the main portion of the dust and of the reaction products are removed therein from the gas. Subsequently, the gas passes into a universal venturi scrubber 4. In the first stage of scrubbing, the top gas is cooled to saturation and scrubbed by means of fresh water. In the subsequent venturi scrubbing process, in the second stage of the scrubber, fine scrubbing of the top gas under precipitation of the residual dust is carried out as well as an alkali scrubbing of the residual content in fluorides, hydrogen fluoride, and $SO_2$. The cleaned top gas is then available in the discharge of scrubber 4 for further use. For example, it can be used for the combustion in the recuperator. A generator for milk of lime is associated with the scrubber, i.e., $CaCO_3$ is passed from a limestone bin to a mixer and from there milk of lime passes to an oxidation pan 7. The scrubbing liquid from scrubber 4 is also fed to this oxidation pan for neutralization of the scrubbing water. Furthermore, the liquid in the oxidation pan is subjected to airing for changing $CaCO_3$ to $CaCO_4$. Further, a flocculation agent is added in this pan 7. The extracted mud water is fed to the drier-cooler-preabsorber 2 for use in the nozzles therein. The cleared scrubbing liquid is discharged from pan 7 via overflow and fed again to the scrubber 4.

The process can be carried out without the oxidation pan in that the mud water from the scrubber 4 is enriched with neutralizing substance and is subsequently directly fed to the drier-cooler-preabsorber 2.

This way, the entire method is carried out in a closed circuit which received from the outside, aside from the top gas, only fresh water and lime stone, while dry waste products (mud) are produced.

A flow diagram is depicted in FIG. 2 which agrees almost completely with the diagram of FIG. 1. However, the first method step includes only a prededusting and no cooling, this being different from the cleaning and dedusting of top gas. In detail, the dust bag is designated by 1 in the diagram and the drier and cooler connected thereto is designated by 2. The prededusted hot exhaust gas, discharged from the dust bag, passes into the drier and cooler, wherein superfinely atomized, mudcontaining circulation scrubbing water is added from the top for cooling and mud drying. The gas then passes into the cyclones 3 in which the major portion of the dust remained in the gas is precipitated. It is also possible to feed the entire extracted dry residue (mud) to the cyclones. The gas is fed from the cyclones to the scrubber 4, whereby in a first stage of scrubbing in fresh water the gas is cooled to the saturation point and subsequently residual dust and, particularly in the equipment shown in FIG. 2, also the hydrogen halides and $SO_2$ are removed by fine scrubbing.

The cleaned exhaust gas is then available in the discharge of scrubber 4 for further use. A discharge fan is here denoted by 9. A lime stone bin 5 and a milk of lime generator 6 are associated with the scrubber 4, and the scrubbing water from scrubber 4 passes to a pan 7, simultaneously receiving the neutralization substances from the milk of lime generator 6. The extracted mud water, slurry, is fed to the drier and cooler 2 while the cleared scrubbing liquid is fed back to the scrubber 4. In dependence upon the dust content in the exhaust gas, it is necessary to add ash for producing a certain amount of mud. In the method shown in FIG. 2, ash is added from the bin 10 to the milk of lime generator 6. It is, however, feasible to add ash prior to feeding the gas to the drier and cooler 2. The ash may be taken from an electrostatic filter which is usually connected serially to the incinerator; i.e., the electrostatic filter will be disposed upstream from the equipment shown in FIG. 2. If ash is not available, it is also feasible to add quartz sand for producing mud.

An only slightly modified method can be taken from FIG. 3, the scrubber works here with a weakly acidic solution, and the cleared scrubbing liquid from neutralization pan 7 is not returned to the scrubber 4. Only hydrogen halide but not $SO_2$ is precipitated.

The particular advantage of the method in accordance with the invention is to be seen in that pursuant to the combined atomization drying of salt solutions with suitable additives such as, for example, ash, a fluid, dry product is produced, being amenable to being deposited and offering no problems as to waste removal such as arising in acidic waste mud.

The method in accordance with the invention may undertake, as can be derived from the foregoing, the complete cleaning of gases from contaminants as well as from suspended substances, i.e., one does not need the precipitators, such as electrostatic filters, as they are used in present-day incinerators, whereby the "additive" is still contained in the exhaust gas and by necessity leads to the desired mud formation during scrubbing.

It should be added that the neutralization can be carried by means of milk of lime in pan 7 as described, or by means of another neutralizing substance.

I claim:
1. A method of exhaust gas dedusting and absorption of contaminating gases characterized by the following method steps:
   1. predusting and cooling of the gas by means of evaporating fresh water,
   2. superfine atomizing of mud containing circulation scrubbing water for further cooling and mud drying,
      2.1 extracting the dried waste mud,
   3. precipitation by centrifugal force of the major portion of the dust from the cooled gas,
      3.1 extracting the precipitated dust,
   4. cooling of the gas up to the saturation point by means of fresh water,
   5. scrubbing of the gas for removal of contaminating gas,
      5.1 discharge of the scrubbing liquid,
      5.2 neutralization of the scrubbing liquid,
      5.3 discharge of the clarified scrubbing liquid,
   6. wet-precipitation of the residual dust from the gas.

2. Method in accordance with claim 1, characterized in that the scrubbing liquid as per step 5.2 is cured and mixed with a flocculation medium and the cleared scrubbing liquid is returned for use in step 5.

3. Method in accordance with claim 1, characterized in that steps 2.1 and 5 are being performed with an alkali excess.

4. Method in accordance with claim 1, characterized in that ash is mixed with the scrubbing liquid either during the neutralization 5.2 or prior to the superfine atomization step 2 for increasing the total amount of solid material whereby the added amount depends upon the content of dust in the exhaust gas.

5. Method in accordance with claim 4, characterized in that the cleared scrubbing liquid as per step 5.3 is used for scrubbing the exhaust gas as per step 5 for additional removal of $SO_2$.

6. Method in accordance with one of the claims 4 or 5, characterized in that the residue of an electrostatic filter, positioned ahead of step 1, is used as ash.

7. Method in accordance with claim 6, characterized in that the added amount is adjusted so that the content of dust and/or ash amounts to the threefold to fourfold amount of the amount of salt that is present.

8. Method in accordance with one of the claims 4 or 5, characterized in that the added amount is adjusted so that the content of dust and/or ash amounts to the threefold to four-fold amount of the amount of salt that is present.

9. Apparatus comprising a presaturator is connected to the top gas discharge outlet of the cupola furnace, which presaturator is provided with a nozzle device for atomizing fresh water that a drier-cooler-preabsorber 2 is connected to the presaturator which drier-cooler-preabsorber is provided with a device for superfine atomization of circulating mud water and with an extracting device for dried mud, that a cyclone group 3 is connected thereto having an extracting device for the precipitated dust, that the cyclone group is connected to a universal venturi scrubber being provided with a discharge for the cleaned top gas, a nozzle device for fresh water, and a discharge for scrubbing water, and that a generator for a neutralizing agent is associated with the scrubber.

10. Apparatus in accordance with claim 9, characterized in that the output of the generator for the neutralizing agent is connected to an oxidation pan.

* * * * *